Sept. 13, 1966  J. H. BREWER  3,272,319
IMMUNOLOGICAL TEST KIT
Filed Oct. 5, 1962  2 Sheets-Sheet 1
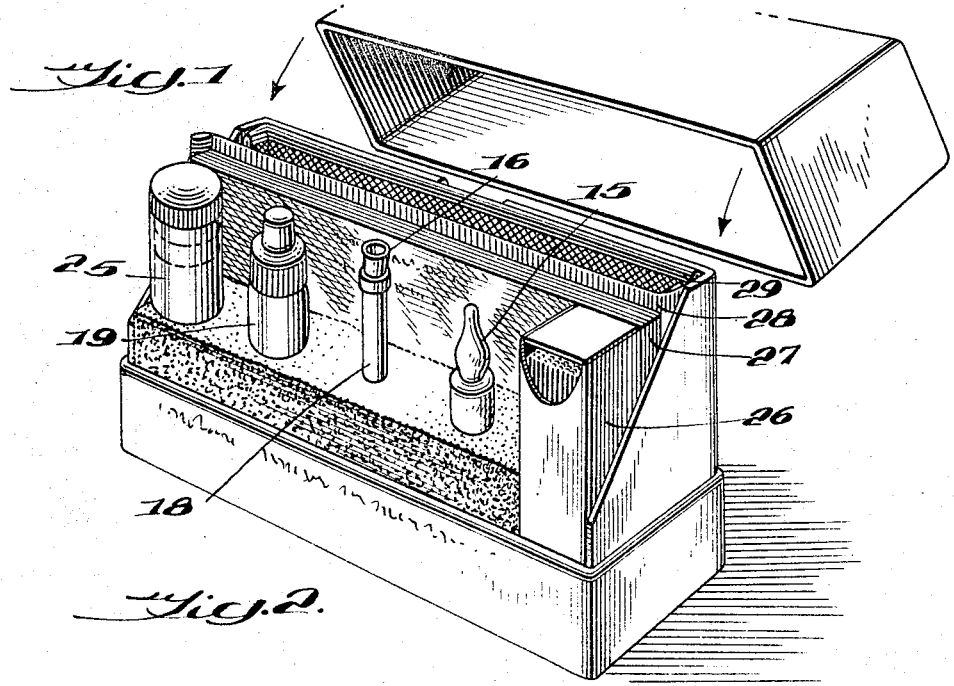
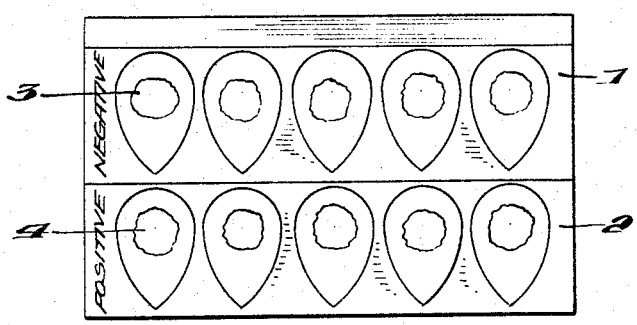
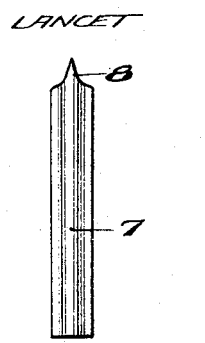
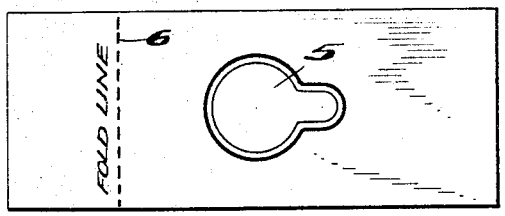
INVENTOR
John H. Brewer
BY Pierce, Scheffler & Parker
ATTORNEYS Sept. 13, 1966  J. H. BREWER  3,272,319
INMUNOLOGICAL TEST KIT
Filed Oct. 5, 1962  2 Sheets-Sheet 2
Fig.5.
TEST CARD
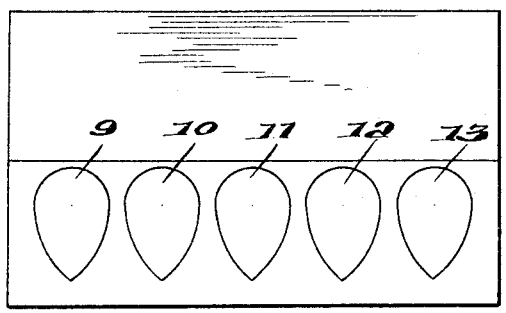
Fig.6.
STIRRING ROD
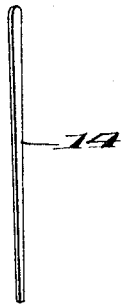
Fig.7.
ANTIGEN AMPOULE
Fig.8.
ANTIGEN DISPENSING NEEDLE
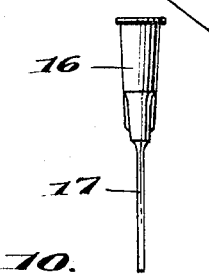
Fig.9.
ANTIGEN DISPENSING BOTTLE
Fig.10.
CAPILLARY
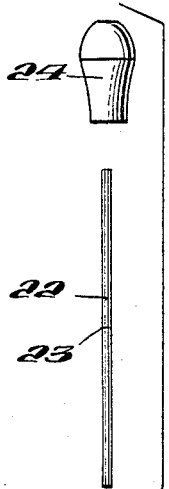
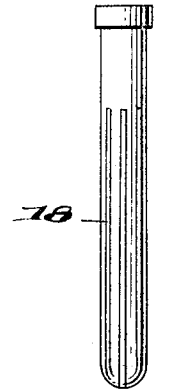
INVENTOR
John H. Brewer
BY Pierce, Scheffler & Parker
ATTORNEYS

United States Patent Office
3,272,319
Patented Sept. 13, 1966

3,272,319
IMMUNOLOGICAL TEST KIT
John H. Brewer, Towson, Md., assignor to Hynson, Westcott & Dunning, Incorporated, a corporation of Maryland
Filed Oct. 5, 1962, Ser. No. 228,640
3 Claims. (Cl. 206—12)

This invention relates to apparatus and a method for testing the plasma or serum of the blood of humans for the determination of the presence or absence therein of the antibodies of diseases such as syphilis and brucellosis. Since the tests are similar the invention will be more fully described hereinafter with reference to syphilis.

There is at present a well known need for a rapid reliable and inexpensive method of testing for diseases such as syphilis and brucellosis. The method commonly used in testing for syphilis of drawing a sample of blood by means of a hypodermic syringe and needle, centrifuging etc. i.e. the so-called Wassermann test is, as is well known, time-consuming, offensive to many persons, not wholly reliable and requires a considerable investment in space and apparatus for making the test and a considerable amount of skill and experience on the part of the person making the test. The Wassermann test is especially not well adapted for testing school children due to the fact that it involves drawing blood from a vein.

The object of the present invention is to provide a kit of apparatus and a method which avoids practically all of the objectionable features of the Wassermann test i.e. apparatus which is inexpensive and readily may be made available for testing at any convenient place and requiring no apparatus other than that found in the kit and a method that can be carried out quickly and substantially painlessly by a relatively unskilled and inexperienced person, giving accurate and reliable results.

The complete apparatus consists of a control card for preliminarily testing the potency of the test antigen, a plasma collection slide, a lancet for drawing a few drops of blood from the person to be tested, a test card, a sealed ampoule containing an aqueous suspension of finely divided solid or pigment such as charcoal and the antigens of the disease in question, hereinafter referred to as the antigen suspension, an antigen suspension dispensing bottle including a detachable dispensing tube or nozzle, a capillary tube equipped with a detachable bulb for handling water and serum or plasma and a stirring rod. These tools which are adapted to be assembled in a relatively small and light weight kit e.g. a kit of 5 by 3 by 2 inches and weighing about ½ pound may be duplicated in the kit, i.e. there may be in the kit a plurality of each of the tools but practically it is expedient to provide a kit having a single ampoule of antigen suspension and a single antigen dispensing bottle with a plurality of each of the other tools, the number of each being calculated to be sufficient for carrying out the number of tests permitted by the amount of antigen suspension available e.g. about 100. This may be regarded as being a unit kit. Also included in the kit there may be a sheet of instructions for the performance of the three main operations i.e. testing the antigen suspension, collecting a sample of plasma and carrying out the actual test.

The apparatus is illustrated in the accompanying drawings in which

FIG. 1 is a perspective view of the kit,
FIG. 2 is a plan view of the control card,
FIG. 3 is a plan view of the plasma collection side,
FIG. 4 is a plan view of a lancet,
FIG. 5 is a plan view of a test card,
FIG. 6 is a plan view of a stirring rod,
FIG. 7 is a plan view of an antigen ampoule,
FIG. 8 is an exploded plan view of the antigen dispensing needle and its supporting and protecting sleeve,
FIG. 9 is an exploded plan view of the antigen dispensing bottle including its protective cap,
FIG. 10 is a plan view of a capillary tube and its bulb.

Referring to the drawings the control card shown in FIG. 2 preferably is a piece of cardboard of the type commonly used as index cards, a suitable size being 3 x 5 inches. The card should be relatively non-absorbent so that aqueous liquid deposited on its surface will remain thereon for at least several minutes. It should not be absorbent like a blotter and may be made substantially completely non-absorbent e.g. by means of a suitable coating. The card is provided with an upper row 1 and a lower row 2 of inverted tear drop shaped depressions, five depressions in each row. The depressions in the upper row are each provided with a spot of a dried deposit 3 of a serum or plasma that is known to be negative or non-reactive to the antigen of the disease in question e.g. syphilis and the depressions of the lower row are each provided with a spot 4 of dried serum or plasma that is known to be reactive with or positive to the antigen of said disease. The card may be provided with suitable legends for example the upper row of depressions may be marked "negative" and the lower row "positive." It is also expedient to color the areas surrounding the two rows of depressions differently e.g. the area surrounding the upper row of depressions may be colored green and the area surrounding the lower row of depressions may be colored red or pink. The control card described above preferably is protected against contamination prior to use by a protective cover or envelope which may be made of paper, metal foil or synthetic resin or plastic.

The plasma collection card shown in FIG. 3 is disclosed and claimed in my co-pending application Serial No. 168,165 filed January 23, 1962 and consists essentially of a cardboard card, suitably 2 x 5 inches provided with a depression 5 and a fold line 6. It is noted that the depression 5 has a circular portion with a relatively narrow projection which will be referred to hereinafter as the collecting slot. This card also may be provided with suitable legends e.g. "fold line."

The lancet shown in FIG. 4 is made of a suitable, preferably rust-resistant metal such as stainless steel and consists of the straight handle portion 7 and the point portion 8. The handle portion 7 may be curved or ribbed to increase its rigidity and it may also be roughened to afford better gripping. The lancet is of course very inexpensive and is designed to be disposable after a single use.

The test card illustrated in FIG. 5 suitably is a 3 by 5 inch cardboard provided with a suitable number e.g. 5 tear drop shaped depressions. The depressions may be provided with suitable legends (not shown) e.g. the first two depressions 9 and 10 may be marked "Patient's Serum," the third depression 11 "Reactive Serum," the fourth depression 12 "Weakly Reactive Serum" and the fifth depression 13, "Nonreactive Serum."

The stirring rod 14 illustrated in FIG. 6 suitably may be an ordinary wood toothpick.

The ampoule 15 shown in FIG. 7 is a conventional glass ampoule containing a solution of known antigen e.g. the antigen of syphilis with finely divided solid material or pigment such as carbon or charcoal in suspension as disclosed in my application Ser. No. 118,824 filed June 22, 1961 now Patent No. 3,074,853.

The antigen dispensing needle assembly shown in FIG. 8 consists of the plastic needle hub 16 secured to the stainless steel capillary tube 17 and the tube 18 which suitably is made of plastic and closed at one end. The needle-hub combination 16, 17 normally is inserted into the open end of the tube 18 which serves to support it and protect it against contamination. The needle 17 is not a hypodermic needle i.e. it is not pointed but is merely designed as a dispensing tube for the antigen-pigment suspension. The hub 16 is designed to form a friction joint with the antigen dispensing bottle shown in FIG. 9.

The antigen dispensing bottle shown in FIG. 9 consists of the container 19 formed of plastic and being flexible so that it may be deformed by the pressure of the thumb and finger to ingest or eject the antigen solution, the nipple 20 which serves to connect the mouth of the container 19 with the hub 16 of the dispensing needle and the closure cap 21. As appears the cap 21 and the neck of the container 19 are screw threaded to provide a tight and secure closure of the container.

The capillary 22 shown in FIG. 10 may be made of any suitable transparent material such as glass or plastic, preferably glass, and is provided with a mark 23 midway of its length so that either end may be inserted into the bulb 24 suitably formed of rubber. The bulb 24 is open at both ends. The tube 22 is of such a size that the plasma to be tested will flow up the tube 22 to the mark 23 by capillary action without the application of suction by means of the bulb 24 but by squeezing the bulb 24 which closes the open end thereof and collapses the side walls the contents of the tube 22 may be expelled therefrom.

The test kit as illustrated in FIG. 1 is a box of a suitable size e.g. 5 by 3 by 2 inches as noted above adapted to contain the parts of the kit described above and illustrated in FIGS. 2 to 10. The box as illustrated, has a cut away front wall to permit ready access to the contents and the kit parts are conveniently arranged therein as follows, suitable partitions or sockets being provided for holding the kit parts in place. In the front row from left to right are a bottle 25 of capillary tubes 22 and bulbs 24, the antigen dispensing bottle 19, 20, 21, the antigen dispensing needle 16, 17 and its supporting tube 18, the antigen ampoule 15 and a container 26 of stirring rods 14. In the rear portion of the box are arranged a package of test cards in a suitable protective wrapping or envelope 27, a package of plasma collection slides in a suitable wrapping or envelope 28 and one or more control cards in a suitable protective wrapping or envelope 29. The lancets are each enclosed in an individual envelope to keep them sterile. A suitable number e.g. five or such envelopes may be arranged in the form of a sheet provided with tear lines between the individual envelopes and one or more of such sheets may be included in the kit, suitably within the protective envelope 28 of the package of collection slides.

It will be appreciated that a great variety of arrangements of the various parts of the kit are possible and that I have in the foregoing described merely one suitable arrangement.

The basic unit of the kit is the ampoule of antigen suspension and it readily can be calculated or determined by experience from the number of tests that normally can be made with the quantity of antigen suspension available in the ampoule how many of the other units of the kit will be needed.

The use of the kit is as follows.

The cap 21 of the antigen dispensing bottle is removed and the antigen dispensing needle hub 16 is attached to the nipple or fitting 20 of the dispensing bottle. The antigen ampoule 15 is shaken to resuspend any pigment that may have settled, the neck of the ampoule is broken and the antigen solution with its suspended pigment is transferred to the dispensing bottle by inserting the needle 17 into the ampoule and using the dispensing bottle as a bulb to suck the antigen solution out of the ampoule and into the bottle. The needle is then removed from the bottle and cleaned by blowing through it or rinsing with water and returned to the tube 18 and the cap 21 is returned to the antigen dispensing bottle.

The antigen solution will keep for a long time in the ampoule and for a reasonable length of time in the bottle. Refrigeration is not necessary but the antigen should not be exposed to direct sunlight or its equivalent or to high temperatures i.e. temperatures above normal room temperatures.

Shortly prior to carrying out a test, preferably on the same day, the antigen solution or suspension should be tested as follows.

Using a capillary tube 22 as illustrated in FIG. 10 place 0.03 ml. of water on each of one of the negative and one of the positive test spots on the control card illustrated in FIG. 2. The capillary tubes are of such a size that when filled from either end up to the mark 23 they will deliver approximately 0.03 ml. of liquid. The bulb 24 may be used, by closing its open end by pinching, to draw liquid into and/or expel liquid from the capillary. The amount of water, 0.03 ml., specified is not critical but has been found to give most satisfactory results.

After the water has been deposited on the test spots it is spread over and mixed with the dried serum or plasma, using a separate stirring rod for each spot, until the serum or plasma is dissolved. Then, using the antigen dispensing bottle and needle shown in FIGS. 8 and 9 one drop (about 1/70 ml.) of antigen suspension is deposited on each of the two previously wetted test spots. The bottle of antigen suspension should be shaken before the suspension is dispensed therefrom and it should be held vertical while dispensing because in this position, the needle has been found to dispense a drop of the desired size. The size of the needle is about 0.03 inch, outside diameter.

After the antigen suspension has been deposited on the test spots each test spot is stirred and spread evenly over the entire test spot area using a separate stirring rod for each. The test spot areas or depressions referred to above are, as stated, inverted tear-drop shaped and their dimensions are about ¾ inch wide and about 1⅛ inch long.

After the antigen suspension has been deposited and spread on the test spot as described above the test card is slowly tilted to-and-fro toward and away from the apex of the test spot for a maximum of 4 minutes allowing sufficient time at each tilting movement for the liquid mixture to flow first into the apex of the test spot so as to bring the suspended solid particles into close proximity with each other and then spread out as the liquid flows away from the apex. If clumping of the suspended solid is observed in less than 4 minutes the tilting of the test card may be stopped. Otherwise the tilting should be continued for the full 4 minutes. Clumping of the suspended solid is evidence of an antigen-antibody reaction and the absence of clumping is evidence of the absence of such a reaction.

If as a result of the above described procedure the negative test spot on the control card does not show evidence of a reaction and the positive test spot does show evidence of a reaction the antigen suspension will be considered to be active and suitable for testing.

The clumping of the finely divided solid and the absence of clumping are readily observable and distinguishable macroscopically but the use of a low power magnifying glass such as a reading glass is not excluded.

A sample of the plasma of a person to be tested for the presence or absence of the syphilis antibody is obtained as follows.

An area of the person's skin e.g. a finger tip is cleaned with antiseptic e.g. alcohol and punctured with the lancet illustrated in FIG. 4. Three drops of blood are dropped freely from the puncture on to the circular part but not on the narrow collecting slot of the area 5 of the plasma collection slide shown in FIG. 3. The blood is then carefully spread over the circular area and stirred for about 20–30 seconds. The depressed area 5 of the plasma collection slide, prior to the deposit of blood thereon, has a coating thereon of a known blood coagulant such as phytohemoagglutinin and heparin as more fully disclosed in my application Serial No. 168,165 referred to above.

After the spreading of the blood over the circular part of the test area 5 as described above the slide is subjected to a tilting motion, causing the blood to rotate within the circle until a pronounced clumping of the blood cells and the coincident separation of the plasma is noted. The slide is then placed on a horizontal support e.g. a table with the end thereof defined by the fold line 6 bent backwardly at an angle of about 90°, thus supporting the depressed area 5 in an inclined position at an angle to the horizontal of about 15–20°. The slide is permitted to rest in this position for about 1–2 minutes to permit the plasma to flow into the narrow collection slot leaving the clumped blood cells in the circular area.

The antigen suspension having been tested and the plasma collected the next step is the mixing of the antigen suspension and the plasma to determine whether there is an antigen-antibody reaction. This is done on the test card illustrated in FIG. 5 as follows.

Using a capillary tube and bulb as illustrated in FIG. 10 0.03 ml. of plasma is taken up from the plasma collection slide and deposited on one or more of the depressions 9–13 on the test card e.g. the areas 9 and 10. As stated above the areas 11, 12 and 13 may be used for check tests with known strongly positive serum, known weakly positive serum and known non-reactive or negative serum. Then on each area on which plasma or serum has been deposited there is deposited one drop (about $\frac{1}{70}$ ml.) of antigen suspension. This is done as described above, by means of the antigen dispensing bottle and needle illustrated in FIGS. 8 and 9 and by holding the bottle vertically over the spots while the drops are being ejected from the needle. The plasma or serum and the antigen suspension which have been deposited on each spot of the test card are then mixed and spread over the entire area, each with a separate stirrer. The test card is then tilted to-and-fro for a maximum of 4 minutes as described above in conection with the testing of the antigen suspension and the results observed. Any clumping of the pigment in the antigen suspension is readily observable, macroscopically and such clumping or the absence of clumping indicates respectively the presence or absence of the antibody of the disease in question e.g. syphilis in the blood sample. It is not difficult to decide, upon observation whether there is clumping or absence of clumping but some information as to the degree of clumping may be obtained by comparison of spots on which the person's plasma is tested with other test spots on which the known strongly positive, weakly positive and negative plasmas or serums were tested.

The test card resulting from the above described procedure may be dried, identified with the person tested, dated and kept as a permanent record.

In the foregoing I have described what I consider to be a complete unit kit but certain elements of the kit may be omitted as being non-essential. For instance the control card illustrated in FIG. 2 may be omitted because the antigen suspension has been found to be highly reliable. The plasma collection slide (FIG. 3) and the lancet (FIG. 4) are essential unless some other source of the plasma or serum to be tested is available. The test card (FIG. 5), stirring rod (FIG. 6), antigen dispensing needle (FIG. 8) and antigen dispensing bottle (FIG. 9) are regarded as being essential. The capillary and bulb combination (FIG. 10) is useful but might be substituted by a loop or pipette. The ampoule of antigen suspension also is highly useful in a kit that may be in existence for a considerable length of time before it is used because it provides excellent preservation of the antigen suspension. However it may be omitted and the antigen suspension preserved for a considerable length of time in the bottle 19. The needle 16, 17 also may be omitted and the mouth of the bottle 19 used for dispensing the antigen suspension.

The essential components of the kit are therefore the test card (FIG. 5), the stirring rod (FIG. 6) the antigen storing and dispensing botttle (FIG. 9) and some suitable means such as the capillary (FIG. 10) or a loop or pipette for depositing serum or plasma on the test card.

I claim:

1. A kit for the performance of immunological tests comprising a container and within said container a non-absorbent test card provided with at least one marked area adapted to receive the test reagent, an antigen dispensing bottle provided with a nozzle for the delivery of antigen suspension to said area, means for delivering a measured amount of the serum or plasma of the blood of a person to be tested to said area, at least one stirring rod for mixing said antigen suspension and serum or plasma in said area and a control card having at least one marked area on the surface thereof containing a deposit of a known reactive serum or plasma and at least one marked area containing a deposit of a known non-reactive serum or plasma.

2. A kit as defined in claim 1 comprising at least one lancet for extracting a few drops of blood from the person to be tested, a plasma collection slide for separating plasma from said blood and an ampoule of antigen suspension.

3. A kit as defined in claim 2 in which the marked areas on said control card and the marked areas on said test card are depressed areas.

References Cited by the Examiner

UNITED STATES PATENTS

| | | | |
|---|---|---|---|
| 1,709,066 | 4/1929 | Field. | |
| 1,995,799 | 3/1935 | Doniger | 206—12 |
| 2,183,663 | 12/1939 | Wilson | 206—12 |
| 2,410,928 | 11/1946 | Christner et al. | 206—12 |
| 2,770,572 | 11/1956 | Eldon | 167—84.5 |
| 3,074,853 | 1/1963 | Brewer | 167—84.5 |

THERON E. CONDON, *Primary Examiner.*

FRANK CACCIAPAGLIA, JR., W. T. DIXSON,
*Examiners.*

A. F. FAGELSON, *Assistant Examiner.*